Sept. 1, 1942.  C. C. JONES  2,294,460
FLUID RECLAMATION APPARATUS
Filed March 25, 1940
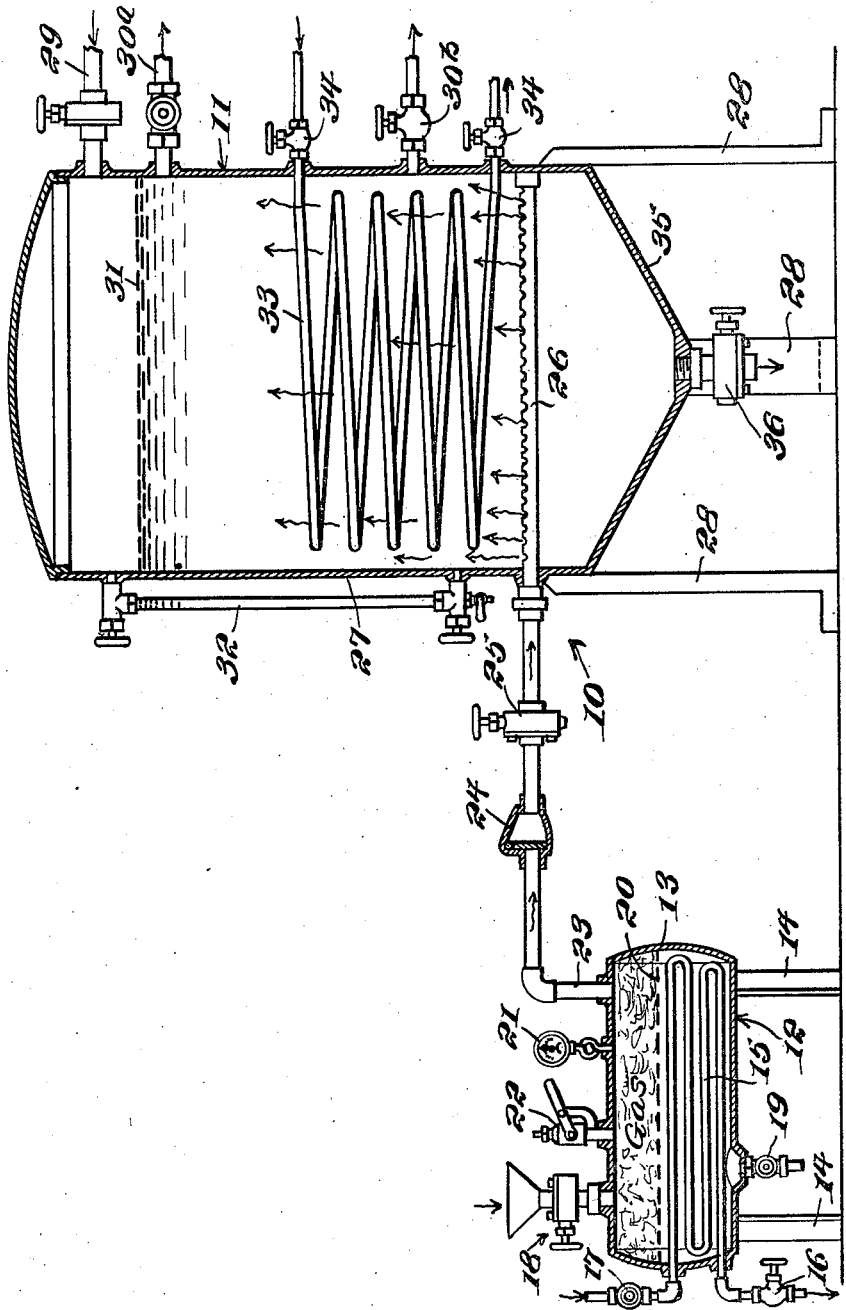

Patented Sept. 1, 1942

2,294,460

UNITED STATES PATENT OFFICE 2,294,460

FLUID RECLAMATION APPARATUS

Colin C. Jones, Inglewood, Calif., assignor to Chemical Reclaiming Sales Co., Inc., Los Angeles, Calif.

Application March 25, 1940, Serial No. 325,897

1 Claim. (Cl. 196—15)

This invention relates to improvements in apparatus useful in the treating, especially in the reclamation of, spent cleaning fluids and has for an object to provide a simple rugged but withal efficient apparatus for practicing processes of cleaning fluid reclamation involving breaking of an emulsion by a treatment with a vaporized material.

Regarded in its broader aspects, the apparatus includes in combination a vaporizing tank and a treatment tank, the treatment tank including near its bottom a foraminous member connected with the vaporizing tank whereby vapor can be conducted at elevated temperatures directly into fluid within the treatment tank.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claim.

Referring then to the drawing, the single figure is essentially a vertical sectional view of the presently preferred embodiment of this invention, wherein it will be seen that the device generally designated by the reference character 10 comprises a treatment tank generally indicated by the reference numeral 11 and a vaporizing tank generally designated by the character 12.

The vaporizing tank assembly comprises the tank proper 13 mounted upon supports 14 having positioned therein a heating coil 15 controlled by valves 16 and 17. A valved inlet 18 is provided for facilitating introduction of material into the tank and an outlet valve 19 located near the bottom of the tank is provided for removal of material from the tank or for cleaning. The material used in the tank is desirably a liquid, the level of which is maintained intermediate the top and bottom of the tank as indicated by the reference numeral 20 and when the liquid is heated by passage of steam or other heating fluid through the coil 15 the vapor pressure within the tank is measured by a gauge 21 and a safety valve 22 is provided to preclude development of extreme or undesirable pressures.

An outlet line 23 communicating with top parts of the tank 13 serves to convey vaporized material from the tank through a check valve 24 and manually adjustable valve 25 to a foraminous member 26 positioned within the treatment tank 27 near the bottom thereof whereby vapor from the vaporizing tank can be used in treating material within the treatment tank.

The treatment tank 27 which is mounted upon supports 28 is provided with an inlet valve 29 located near the top thereof and with outlet valves 30a and 30b located at intermediate parts of the tank to facilitate removal of liquids from within the tank which have separated into layers, as for instance the components of an emulsion which has been broken. The level of fluids within the tank preferably is determined by means of a conventional sight glass 32 and, for purposes of treatment, a heating coil 33 controlled by valves 34 is mounted within the tank intermediate the foraminous member 26 and the tank top substantially as shown. The bottom portion 35 of the tank 27 is of inverted conical shape whereby sludge and the like within the tank accumulates near the center of the bottom and can conveniently be drained or removed by appropriate manipulation of a valved outlet 36.

It is to be understood that this invention is capable of extended application and is not confined to the precise illustrated forms nor described construction and, therefore, such changes and modifications may be made therein as do not affect the spirit of the invention nor exceed the scope of the appended claim.

Having thus described the present invention, what it is desired to secure by Letters Patent is:

An apparatus for use in reclamation of spent cleaning fluids, comprising a vertically disposed tank for the spent cleaning fluid having a tapered lower end provided with a sludge outlet, a cleaning fluid inlet at the upper end of the tank, two fluid outlets arranged at different levels, a hollow foraminous member arranged in the bottom of the tank above the tapered portion, a vaporizing tank adjacent the first mentioned tank, means for supplying fluid to said tank, heating coils in said tank, a pipe connected to the upper end of the vaporizing tank and connected to the foraminous member, and a heating coil in the first mentioned tank directly above the hollow foraminous member.

COLIN C. JONES.